United States Patent [19]

Corrente et al.

[11] Patent Number: 5,170,920

[45] Date of Patent: Dec. 15, 1992

[54] LUGGAGE RACK

[75] Inventors: Thomas R. Corrente, West Bloomfield; Paul E. Scapini, Grosse Pointe Woods; Robert R. Lazarevich, Rochester; Craig A. Stapleton, Port Huron, all of Mich.

[73] Assignees: Masco Corporation, Taylor; Chrysler Corporation, Highland Park, both of Mich.

[21] Appl. No.: 655,848

[22] Filed: Feb. 15, 1991

[51] Int. Cl.5 .............................................. B60R 9/00
[52] U.S. Cl. .................................... 224/321; 224/326
[58] Field of Search ............... 224/321, 325, 326, 309; 410/104, 105, 130, 132, 139, 143, 150

[56] References Cited

U.S. PATENT DOCUMENTS

| | | |
|---|---|---|
| 788,165 | 4/1906 | McFadden . |
| 867,911 | 10/1907 | Buttress . |
| 1,310,975 | 7/1919 | Wheary . |
| 1,312,562 | 8/1919 | Morse . |
| 1,313,868 | 8/1919 | Wheary . |
| 1,362,255 | 12/1920 | Lund . |
| 1,385,308 | 7/1921 | Copelin . |
| 1,431,385 | 10/1922 | Etheridge . |
| 1,838,344 | 11/1931 | Wilson . |
| 1,854,946 | 4/1932 | Loring . |
| 1,898,280 | 2/1933 | Winkelmann . |
| 1,934,697 | 8/1931 | Butterworth . |
| 2,014,363 | 9/1935 | Whitted . |
| 2,052,914 | 9/1936 | Williams . |
| 2,117,049 | 5/1938 | Widman et al. . |
| 2,135,784 | 11/1938 | Bachor . |
| 2,209,977 | 8/1940 | Johnson . |
| 2,225,725 | 12/1940 | Van Ranst . |
| 2,253,561 | 8/1941 | Harden . |
| 2,422,693 | 6/1947 | McArthur . |
| 2,469,659 | 5/1949 | Martin . |
| 2,688,289 | 9/1954 | Sterling . |
| 2,707,797 | 5/1955 | Juhlin et al. . |
| 2,750,221 | 6/1956 | McClelland . |
| 2,859,995 | 11/1958 | Rigaud . |
| 2,887,735 | 5/1959 | Coffey . |
| 2,891,490 | 6/1959 | Elsner . |
| 2,903,540 | 9/1959 | Gloviak et al. . |
| 2,973,984 | 3/1961 | Burke . |

(List continued on next page.)

FOREIGN PATENT DOCUMENTS

| | | |
|---|---|---|
| 2364797 | 7/1974 | Fed. Rep. of Germany . |
| 2940463C2 | 9/1985 | Fed. Rep. of Germany . |
| 53-98099 | 8/1978 | Japan . |
| 59-82166 | 6/1984 | Japan . |
| 61-24334 | 2/1986 | Japan . |

OTHER PUBLICATIONS

O. Bodies (Vauxhall) 94568–Jun. 16, 1933—5 pages.
O. Bodies (Berkeley) 47508 May 3, 1919—2 pages.
O. Bodies (Cambolt) 14960 Nov. 1924—1 page.
O. Bodies (Automobile & Carriage Builders Journal ) 151,417—1 page.
O. Bodies (Seifert) 32800—1924—1 page.
O. Bodies (Austin) 87204–1929—1 page.
O. Bodies (Horch) 201,192-1931—1 page.
O. Bodies (Engl) 10792–1921—1 page.
O. Bodies (Mercedes-Benz) 89524–1932—1 page.
O. Bodies (Automotive Industries) 28632–1921—1 page.

(List continued on next page.)

Primary Examiner—Linda J. Sholl
Attorney, Agent, or Firm—Barnes, Kisselle, Raisch, Choate, Whittemore & Hulbert

[57] ABSTRACT

A luggage rack for an automotive vehicle comprising a pair of side rails adapted to be mounted on the roof of an automotive vehicle in laterally spaced apart relation. Each rail has an elongated slot extending lengthwise thereof. One or more cross members extending between the rails have stanchions at the ends slidably engageable in the slots. The slots open at an angle slanting away from the vehicle roof and toward one another to resist forces tending to separate the stanchions from the side rails. Each stanchion has a flange which hooks over a slot-defining flange of a rail to provide additional resistance to separation. The stanchions are releasably locked to the rails by locking pins engageable in apertures in the rails.

15 Claims, 5 Drawing Sheets

U.S PATENT DOCUMENTS

| | | |
|---|---|---|
| 3,239,115 | 3/1966 | Bott et al. |
| 3,253,755 | 5/1966 | Bott . |
| 3,282,229 | 11/1966 | Elsner . |
| 3,328,079 | 6/1967 | Byczkowski et al. |
| 3,334,718 | 8/1967 | Davidson . |
| 3,342,527 | 9/1967 | Bencene . |
| 3,344,749 | 10/1967 | Bass et al. |
| 3,396,234 | 2/1967 | Hansen et al. |
| 3,451,602 | 6/1969 | Bott . |
| 3,519,180 | 7/1970 | Bott . |
| 3,536,358 | 10/1970 | Masucci . |
| 3,554,416 | 1/1971 | Bott . |
| 3,596,981 | 8/1971 | Koziol . |
| 3,610,491 | 10/1971 | Bott . |
| 3,615,069 | 10/1971 | Bott . |
| 3,643,973 | 2/1972 | Bott . |
| 3,792,884 | 2/1974 | Tutikawa . |
| 3,799,609 | 3/1974 | Cunningham . |
| 3,826,457 | 7/1974 | Huot de Longchamp . |
| 3,840,250 | 10/1974 | Bott . |
| 3,848,785 | 11/1974 | Bott . |
| 3,856,193 | 12/1974 | Bott . |
| 3,885,810 | 5/1975 | Chika . |
| 3,951,320 | 4/1976 | Bott . |
| 3,977,725 | 8/1976 | Tengler et al. |
| 4,015,760 | 4/1977 | Bott . |
| 4,020,770 | 5/1977 | McLennan et al. |
| 4,047,689 | 9/1977 | Grendahl ............... 410/105 |
| 4,049,311 | 9/1977 | Dietrich et al. |
| 4,055,284 | 10/1977 | Bott . |
| 4,055,285 | 10/1977 | Bott . |
| 4,106,680 | 8/1978 | Bott . |
| 4,114,947 | 9/1978 | Nelson . |
| 4,146,198 | 3/1979 | Bott . |
| 4,155,585 | 5/1979 | Bott . |
| 4,156,497 | 5/1979 | Bott . |
| 4,165,827 | 8/1979 | Bott . |
| 4,170,322 | 10/1979 | Bott . |
| 4,174,794 | 11/1979 | Bott . |
| 4,175,682 | 11/1979 | Bott . |
| 4,222,508 | 9/1980 | Bott . |
| 4,230,432 | 10/1980 | Bott . |
| 4,239,139 | 12/1980 | Bott . |
| 4,240,571 | 12/1980 | Ernst . |
| 4,266,708 | 5/1981 | Bott . |
| 4,269,339 | 5/1981 | Bott . |
| 4,274,568 | 6/1981 | Bott . |
| 4,277,009 | 7/1981 | Bott . |
| 4,342,411 | 8/1982 | Bott . |
| 4,345,706 | 8/1982 | Benit . |
| 4,406,386 | 9/1983 | Rasor et al. ............... 224/321 |
| 4,426,028 | 1/1984 | Bott . |
| 4,427,141 | 1/1984 | Bott . |
| 4,428,517 | 1/1984 | Bott . |
| 4,432,478 | 2/1984 | Bott . |
| 4,433,804 | 2/1984 | Bott . |
| 4,440,333 | 4/1984 | Bott . |
| 4,442,961 | 4/1984 | Bott . |
| 4,448,336 | 5/1984 | Bott . |
| 4,501,385 | 2/1985 | Bott . |
| 4,516,709 | 5/1985 | Bott . |
| 4,534,496 | 8/1985 | Bott . |
| 4,588,117 | 5/1986 | Bott . |
| 4,673,119 | 6/1987 | Bott . |
| 4,717,298 | 1/1988 | Bott . |
| 4,838,467 | 6/1989 | Bott et al. |
| 4,842,176 | 6/1989 | Stapleton . |
| 4,877,168 | 10/1989 | Bott . |
| 4,883,208 | 11/1989 | Bott . |
| 4,887,947 | 12/1989 | Bott . |
| 4,890,777 | 1/1990 | Bott . |
| 4,903,876 | 2/1990 | Bott . |
| 4,982,886 | 1/1991 | Cucheran ............... 224/321 |
| 5,007,570 | 4/1991 | Himmel . |

OTHER PUBLICATIONS

O. Bodies (Leveroll) 89525-1932—1 page.
O. Bodies (Steel Tube Furniture Co.) 184,946-1945—1 page.
O. Bodies (Chapman) 108,223-1935—1 page.
O. Bodies (Wilmot-Breeden) 96903-1933—1 page.
O. Bodies Automobiletechnische Zeitschrift-101,7-09-1934—1 page.
O. Bodies (Remax) 104,205 1934—1 page.
Group XXXII containing ten sheets-pp. 124, 118, 87, 30, 34, 77, 19, 8, 5, 78.
Van Auken Movable Seat—3 pages.
Aeroquip-catalog 354—2 pages.
Aeroquip-catalog 354—6 pages.
JobVan Engineered Interior Systems—3 pages.
Accessori Auto Nov. 3, 1976—4 pages.
Mottez-Paris Auto Show—2 pages.
Corriere—2 pages.
Autoaccessori di Classe—3 pages.
Galeries Fixes et Amovibles—8 pages.
1939-1959 Supless—2 pages.
Le Support "Ideal"—3 pages.
Turin Auto Show—4 pages.

LUGGAGE RACK

This invention relates generally to luggage racks and refers more particularly to a luggage rack for an automotive vehicle.

BACKGROUND

Luggage racks are extremely useful and popular accessory items for carrying a load on an exterior surface of an automotive vehicle. Typically such racks are mounted on the roof of the vehicle.

There are many prior art patents on luggage racks and article carriers. Early forms of such racks employing side rails with intermediate skid strips are shown in U.S. Pat. No. 26,538 and U.S. Pat. No. 26,539. More recent examples of racks of this general type are disclosed in U.S. Pat. Nos. 4,225,068, 4,239,138, 4,279,368 and 4,616,772.

Another general type of rack or carrier that has been used has slats along the sides of the vehicle on which stanchions connected to cross members are mounted. Examples of this type of rack are disclosed in U.S. Pat. Nos. 4,132,335, 4,244,501, 4,372,469, 4,406,386, 4,448,337, 4,469,261, 4,516,710 and 32,706.

In several recent designs, the cross members have stanchions which are slidably engaged with the side rails so that the cross members may be moved along the side rails to conform more or less to the size of the load and then locked in position by a pin type or other locking mechanism. Examples of this design are shown in U.S. Pat. Nos. 4,132,339, 4,406,386 and U.S. patent application Ser. No. 250,705. Additional patents of interest are U.S. Pat. Nos. 4,684,048 and 4,754,905.

There are forces acting on a loaded luggage rack when the vehicle is travelling at a high rate of speed, or during sudden braking or acceleration, that tend to separate the rack from the vehicle and the cross members from the rails. This is a serious problem for racks with movable cross members and pin type locking mechanisms.

SUMMARY

The luggage rack of this invention comprises a pair of side rails adapted to be mounted on an exterior body surface of an automotive vehicle in laterally spaced apart relation. Each rail has an elongated slot extending lengthwise thereof. One or more cross members extending between the rails have stanchions at the ends slidably engageable in the rail slots. The slots open at an angle slanting away from the exterior body surface and toward one another to resist the forces at high speeds and during sudden stopping and starting which tend to separate the stanchions from the side rails.

The rails have flanges defining the sides of the slots which are slanted at substantially the same angle as the slots. Each stanchion has a portion which hooks over one of the slot flanges and provides additional resistance to separation of the stanchion from the rail.

The stanchions are releasably locked to the rails by locking pins engageable in apertures provided in the rails. These locking pins are so oriented as not to be placed under stress by forces tending to separate the stanchions from the rails.

It is an object of this invention to provide a luggage rack having the above features, which is rugged and dependable, composed of a relatively few simple parts and capable of being readily and inexpensively manufactured.

Other objects, features and advantages of the invention will become more apparent as the following description proceeds, especially when considered with the accompanying drawings.

DETAILED DESCRIPTION

Referring now more particularly to the drawings and especially to FIGS. 1-7, there is shown a luggage rack 10 including a pair of elongated rails 12 and 14 mounted on the exterior body surface, specifically the roof top 16, of an automotive vehicle 18. The rails extend lengthwise of the vehicle in laterally spaced apart relation. Cross members 20 and 22 extend crosswise of the vehicle from one rail to the other. Each cross member has a stanchion 24 at one end slidably engageable with the rail 12 and a stanchion 26 at the opposite end slidably engageable with the rail 14.

Figure 1:
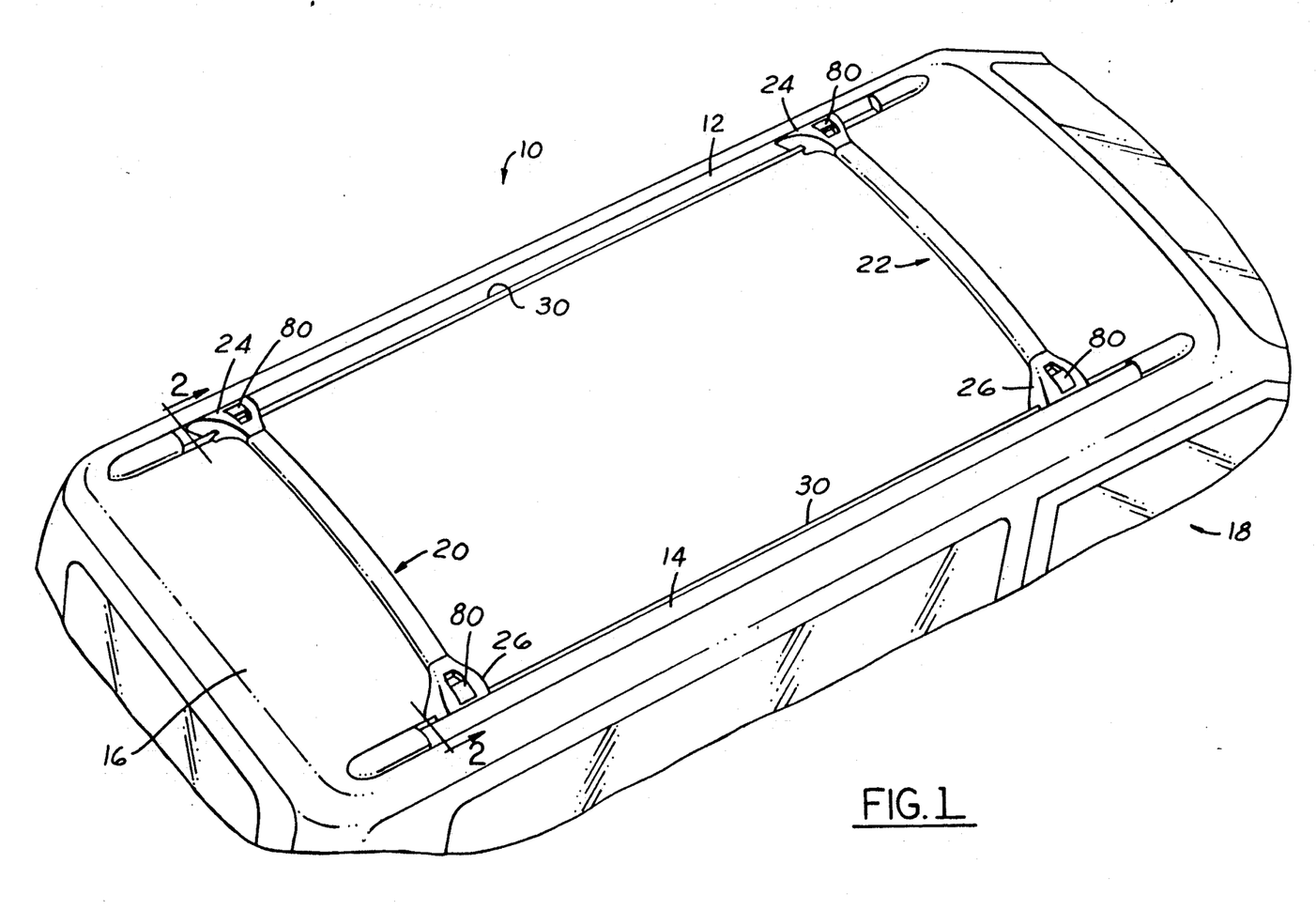
FIG. 1 is a perspective view showing a luggage rack constructed in accordance with this invention mounted on the roof of an automotive vehicle.
Figure 2:
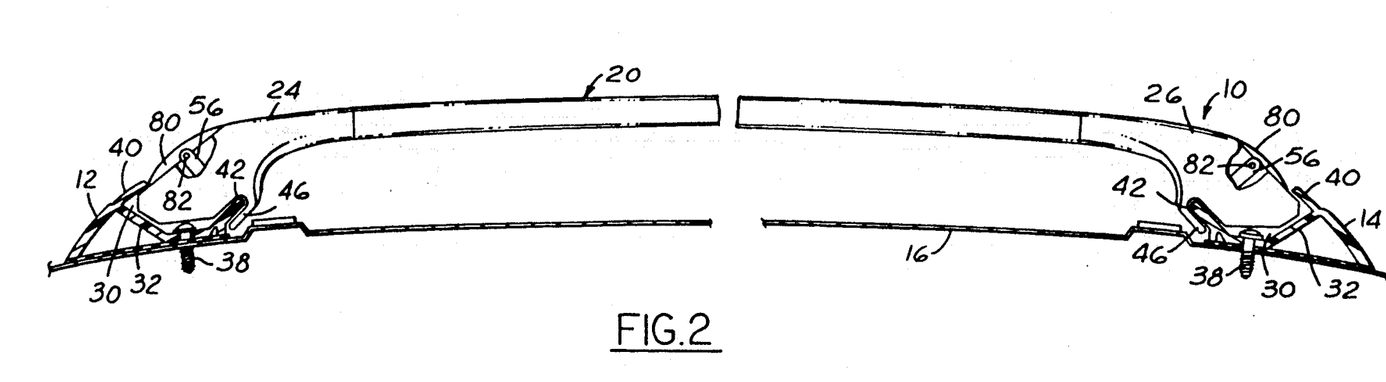
FIG. 2 is a view with parts broken away and parts in section taken on the line 2—2 in FIG. 1.

The rails 12 and 14 throughout substantially their full length are mirror images of one another in cross section as shown in FIG. 2. Each rail has an elongated slot 30 extending lengthwise thereof. The slot is channel-shaped and has a base 32 formed by two angularly related bottom walls 34 and 36. Fasteners 38 through wall 36 rigidly secure the rail to the top exterior surface 16 of the vehicle body. Each rail has an outer flange 40 defining the outer side wall of the slot and an inner flange 42 which is parallel to outer flange 40 and defines the inner side wall of the slot. The slots in the rails open at an angle slanting away from the exterior body surface of the vehicle and toward one another when the rails are mounted on the exterior body surface as shown. The outer and inner flanges 40 and 42 which define the side walls of the slots also slant away from the exterior body surface and toward one another at the same angle as the slots.

The stanchions 24 and 26 are mirror images of one another. Each stanchion has a hollow body or terminal portion 44 shaped to fit into one of the slots. A flange 46 extending downwardly and outwardly from the wall 48 of terminal portion 44 at the same angle as the inner flange 42 of the rail, forms with wall 48 a U-shaped portion 50 which hooks over the inner flange 42. Because of the upward and laterally inward slant of the slots 30 and the outer and inner flanges 40 and 42 of the rails, and because the flange 46 of the stanchion is similarly slanted and disposed under the inner flange 42, the stanchions are effectively prevented from lifting out of the slots and separating from the rails.

The inner flange 42 of each of the rails has a plurality of longitudinally spaced openings 52 along its length for the purpose of cooperating with locking pins 56 carried by the stanchions.

Each stanchion carries one locking pin 56. This locking pin preferably has an elongated cylindrical rod 58 and a head 60 at one end of the rod. The pin is supported in the chamber 62 in the hollow terminal portion 44 of the stanchion for longitudinal sliding movement along a line at right angles to the inner flange 42 with the rod 58 sliding in a hole 63 in wall 64 and the head sliding in an aligned hole 66 in the opposite wall 48. The locking pins 56 in the two stanchions of each cross member thus extend at an angle slanting toward the exterior body surface and toward one another, as shown in FIG. 2.

The head 60 is of generally rectangular configuration in a plane at right angles to the longitudinal axis of the rod 58 and elongated in the direction of the slots 30 in the rails. The hole 66 in which the head 60 slides is of the same rectangular form as the head to closely receive the head. Laterally spaced apart arcuate guides 72 and 74 are formed integrally with wall 48 and project into the chamber 62 in the terminal portion 44 of each stanchion and guide the head 60 during longitudinal sliding movement of the locking pin.

Figure 3:
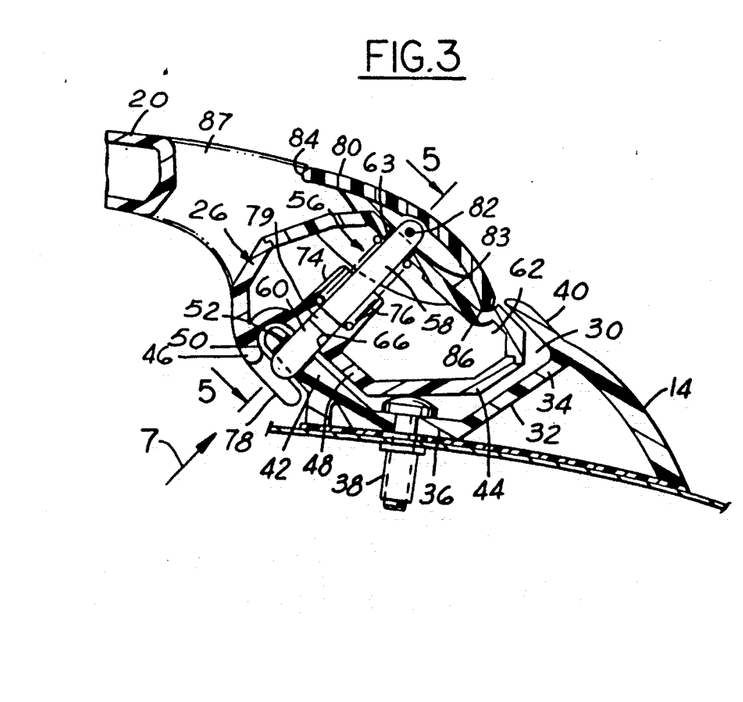
FIG. 3 is an enlarged sectional view of a stanchion on one end of a cross member of the luggage rack, shown engaged in the slot of a side rail with the locking pin in the extended locking position.

The locking pin 56 is urged to the extended locking position shown in FIG. 3 by a compression coil spring 76. The spring surrounds the rod 58 of the locking pin and bears at one end against the chamber wall 64 and at the opposite end against head 60. In the extended position of the locking pin, the head 60 projects through one of the openings 52 in the inner flange 42 of the rail to lock the stanchion and hence the cross member 20 or 22 in position. The flange 46 on the stanchion is formed with a clearance opening 78 to clear the head 60 in the extended position of the locking pin. The head 60 has flanges 79 at the inner end which abut against the inner side of wall 48 in the extended position of locking pin 56.

A cap 80 preferably of rectangular form is pivoted intermediate its ends to the upper end of the rod 58 of the locking pin by a pivot pin 82 exteriorly of the wall 64 of the stanchion. In the extended position of the locking pin, the cap 80 is pivoted flat against the stanchion and disposed within a recess 83 in the wall 64 of the stanchion so as to be substantially flush with the outer contour of the stanchion without any projecting edges (see FIGS. 3 and 5).

Figure 4:
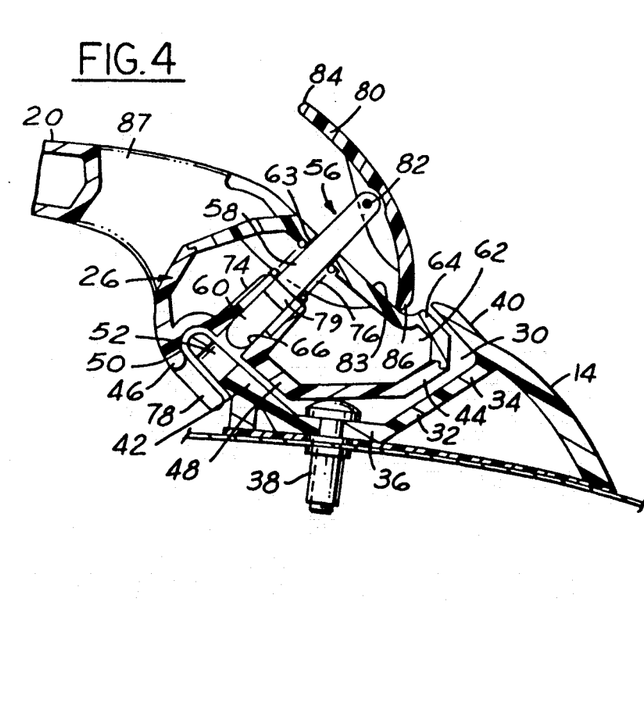
FIG. 4 is a view similar to FIG. 3, but shows the locking pin retracted.
Figure 5:
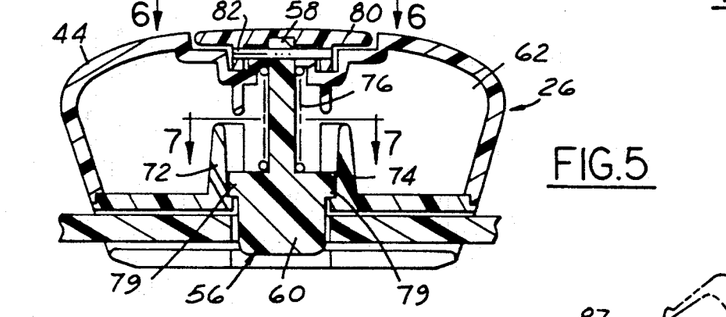
FIG. 5 is a sectional view taken on the line 5—5 in FIG. 3.
Figure 6:
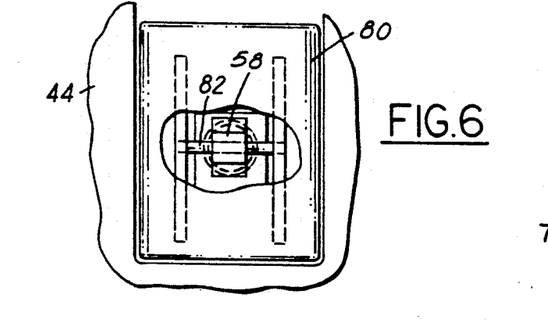
FIG. 6 is a view taken on the line 6—6 in FIG. 5.
Figure 7:
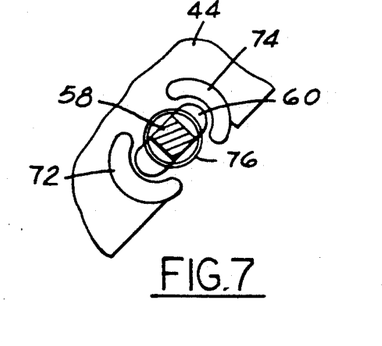
FIG. 7 is a sectional view taken on the line 7—7 in FIG. 5.

The locking pin 56 may be withdrawn to the retracted position of FIG. 4 by lifting one edge 84 of the cap and turning it about its opposite edge 86 as a fulcrum. The stanchion has a relieved or open area 87 to permit a finger to be inserted under the edge 84 of the cap and thus facilitate the withdrawal of the locking pin 56 to retracted position.

Figures 8, 9:
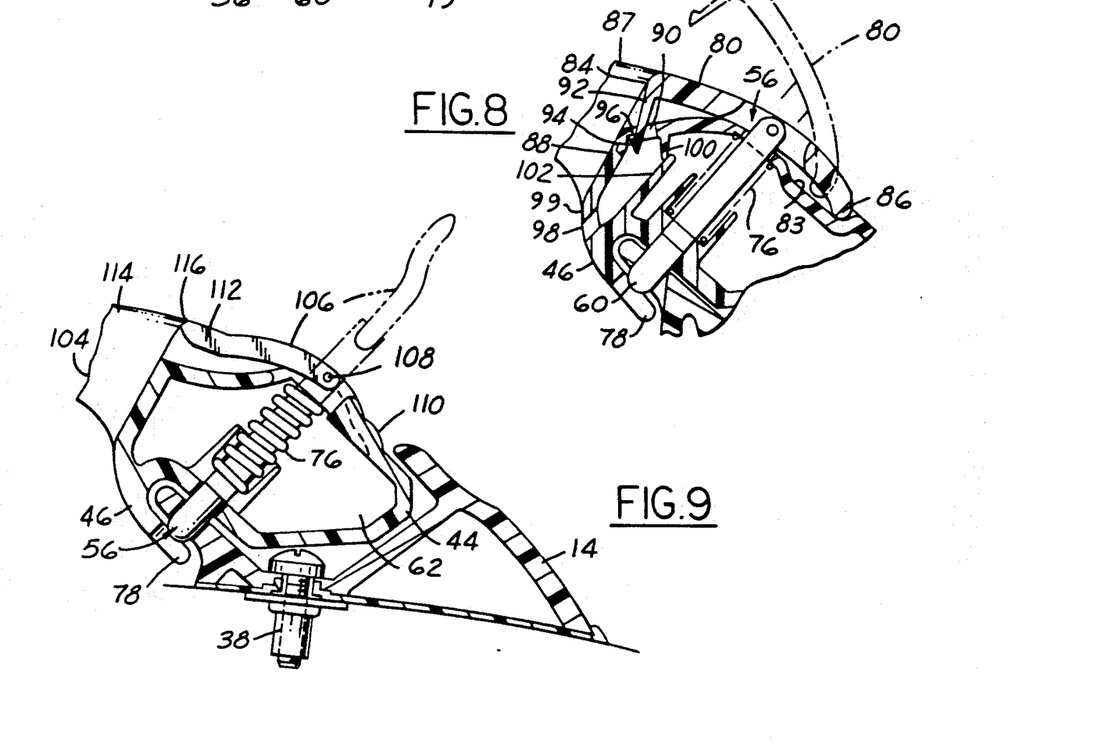
FIG. 8 is a fragmentary sectional view of a modification, showing the locking pin and cap for retracting the locking pin in solid lines, and showing the position of the cap when retracting the locking pin in dotted lines.
FIG. 9 is a sectional view of another modification, showing the locking pin and flap for retracting the locking pin in solid lines, and showing the position of the flap when retracting the locking pin in dotted lines.
Figures 10, 13:
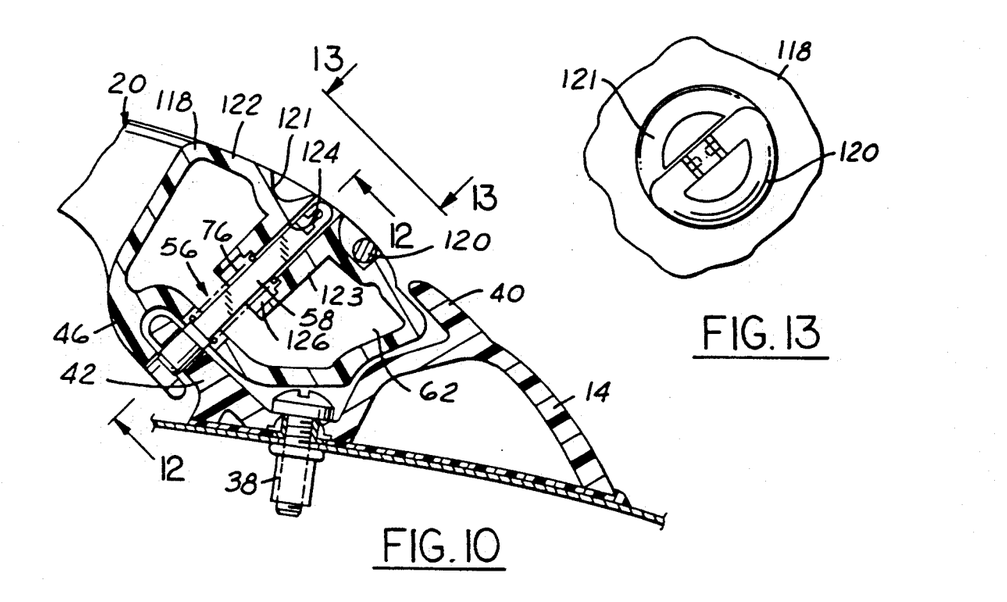
FIG. 10 is a sectional view showing a further modification, with the locking pin in the extended locking position.
FIG. 13 is a view taken on the line 13—13 in FIG. 10.
Figure 11:
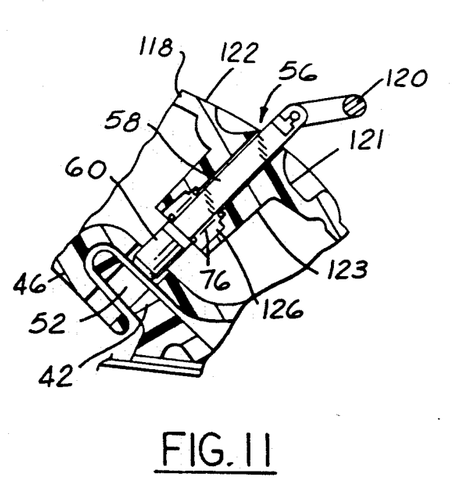
FIG. 11 is a fragmentary sectional view of the structure of FIG. 10, but shows the locking pin retracted.
Figure 12:
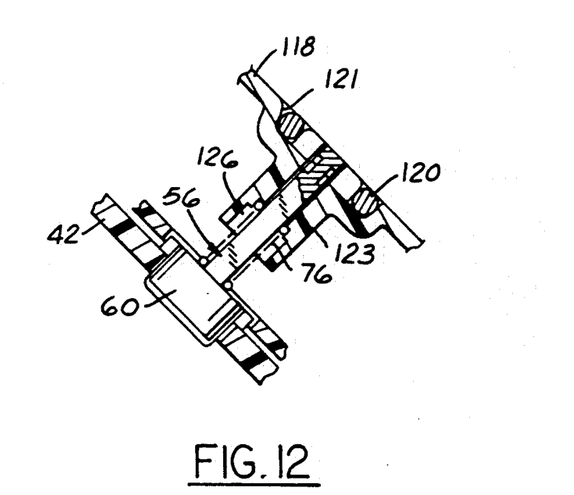
FIG. 12 is a sectional view taken on the line 12—12 in FIG. 10.

FIG. 8 shows a modified stanchion 89 which is like that of FIGS. 1-7 but in which an opening 90 is provided in chamber wall 88. Also the edge 84 of the cap 80 has an extension 92 provided with a terminal tang or latch 94. When the locking pin is in its extended position with cap 80 disposed in recess 83, extension 92 projects through opening 90 and the tang or latch 94 engages a retainer lip 96 on the chamber wall 88 to retain the cap in the illustrated solid line position. The extension 92 is sufficiently flexible so that when a finger is inserted under the cap edge 84 to lift the cap and withdraw the locking pin, the extension 92 may be flexed inwardly relative to the chamber wall to release the latch 94 from the retaining lip 96. A drain hole 98 in the bottom wall 99 permits water which may enter the chamber 62 through opening 90 to be drained away. Any water entering through opening 90 will be confined within the laterally inner portion of the chamber and directed to drain hole 90 by partitions 100, and 102 within the chamber. Otherwise, the stanchion in FIG. 8 is like that of FIGS. 1-7. It will be understood that a cross member may have a stanchion and locking mechanism as in FIG. 8 at one end engageable in the slot of one of the rails 12, 14 and a stanchion and locking mechanism of mirror image construction at the other end engageable in the slot of the other rail.

FIG. 9 shows a further modification in which the stanchion 104 is essentially like the stanchions in FIG. 1-7 except for the construction of the cap for retracting the locking pin. The cap in FIG. 9 is in the form of a flap 106 pivoted at one end to the locking pin by a pivot pin 108. In the extended position of the locking pin, the flap is pivoted flat against the stanchion and the top wall 110 of the stanchion has a recess 112 for receiving the flap. In this position, the flap is flat against the stanchion and flush with its outer contour. To retract the locking pin, the flap 106 is lifted or pivoted to the dotted line position by inserting a finger into the clearance space or opening 114 under the free edge 116 of the flap. Pulling up on the flap retracts the locking pin. A cross member may have a stanchion and locking pin construction as in FIG. 9 at one end and one of mirror image construction at the opposite end.

The FIGS. 10-13 show still another modification of stanchion. The stanchion 118 there shown has a ring-shaped handle 120 made from a wire formed into a half circle and with end portions turned toward one another and pivotally connected to the end of the locking pin. The top wall 122 of the stanchion has an annular recess 121 into which the handle 120 may be pivoted when the locking pin is in its extended locking position. In this position, the handle is flat against the stanchion and substantially flush with its outer contour. The top wall 122 of the stanchion has an integral tubular formation 123 around the passage 124 through which the rod 58 of locking pin 56 extends. This tubular formation 123 is counterbored at 126 to receive and provide an abutment for the upper end of spring 76. Guides 72 and 74 in the construction of FIGS. 1-7 are not employed in the construction of FIGS. 10-13. Otherwise, than as described, the modification of FIGS. 10-13 is substantially like FIG. 1-7. Obviously a stanchion 118 and another of mirror image construction may be provided on opposite ends of a cross member.

FIGS. 14-17 disclose a further modification which is different in some respects from those previously described, and particularly in that the spring 128 for the locking pin 129 in the construction of FIGS. 14-17 urges the locking pin to its retracted position whereas in the previously described embodiments the spring urges the locking pin towards its locking position.

The stanchion in FIGS. 14-17 shown at one end of a cross member is like those previously described in that it has a hollow terminal portion 130 fitting in the slot 30 of the rail 14. Also, as in the previously described embodiments, the terminal portion has a flange 132 extending downwardly and outwardly from the wall 134 of the terminal portion at the same angle as the inner flange 42 of the rail, forming with wall 134 a U-shaped portion 136 which hooks over the inner flange 42. The inclination of the flange 132 is like that in previous embodiments so that this flange cooperates with the rail slot in preventing the stanchions from lifting out of the rails slots.

The locking pin 129 has a relatively large diameter cylindrical outer end portion 138 and a cylindrical inner end portion 140 of relatively smaller diameter. The locking pin is supported in the chamber 142 of the hollow terminal portion of the stanchion for longitudinal sliding movement along a line at right angles to the inner flange 42, as in those embodiments previously described. The large diameter outer end portion 138 of the locking pin is rotatable and axially slidable in a hole 144 in the outer wall 146 of the chamber 142. The small diameter portion 140 of the locking pin is rotatable and axially slidable in a hole 148 in the inner wall 134 of the chamber. A tubular guide 152 integral with the inner wall 134 extends into the chamber 142 and surrounds the small diameter portion 140 of the pin in concentric spaced relation therewith. A compression coil spring 154 surrounds the small diameter portion 140 of the pin and is compressed between the bottom of the tubular guide 152 and the shoulder 155 which separates the large and small diameter portions of the locking pin.

Figures 14, 16, 17:
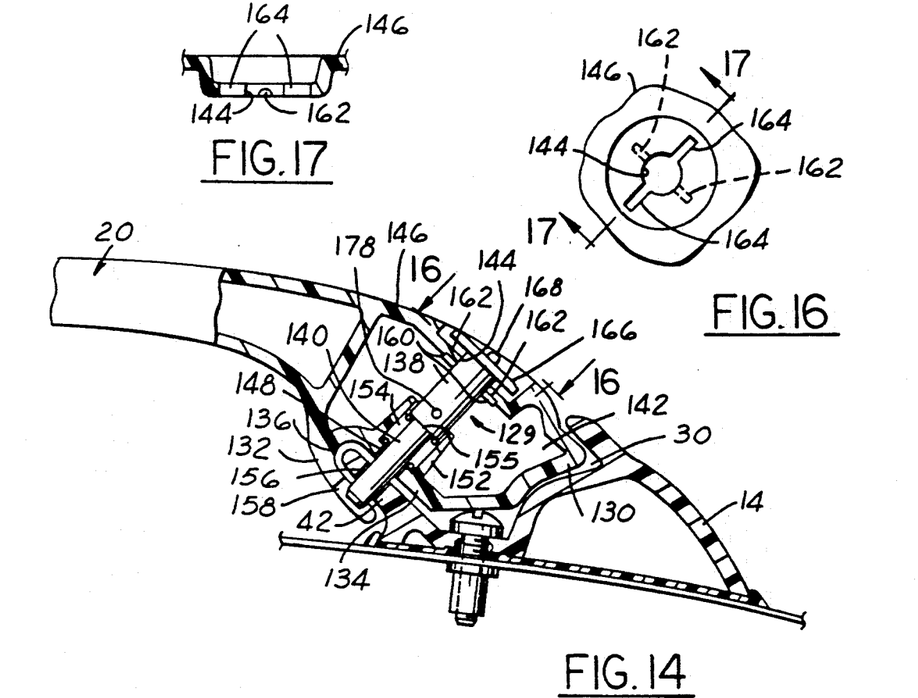
FIG. 14 is a sectional view of still another modification, showing the locking pin in the extended locking position.
FIG. 16 is a view taken on the line 16—16 in FIG. 14.
FIG. 17 is a sectional view taken on the line 17—17 in FIG. 16.

FIG. 14 shows the locking pin in its extended position in which its inner end portion 140 projects through a hole 156 in the flange 42 of the rail to lock the stanchion in position. The hole 156 is preferably circular and of slightly larger diameter than the inner end portion of the locking pin, rather than being elongated as in previous embodiments. The flange 132 has an opening 158 to clear the locking pin when in its extended position.

Aligned pin-like stops 160 extend radially outwardly from diametrically opposite sides of the large diameter portion 138 of the locking pin near its upper end. These stops engage in recesses 162 formed in the inner surface of the wall 146 of the chamber to retain the locking pin in the FIG. 14 position against the force of the spring.

Figure 15:
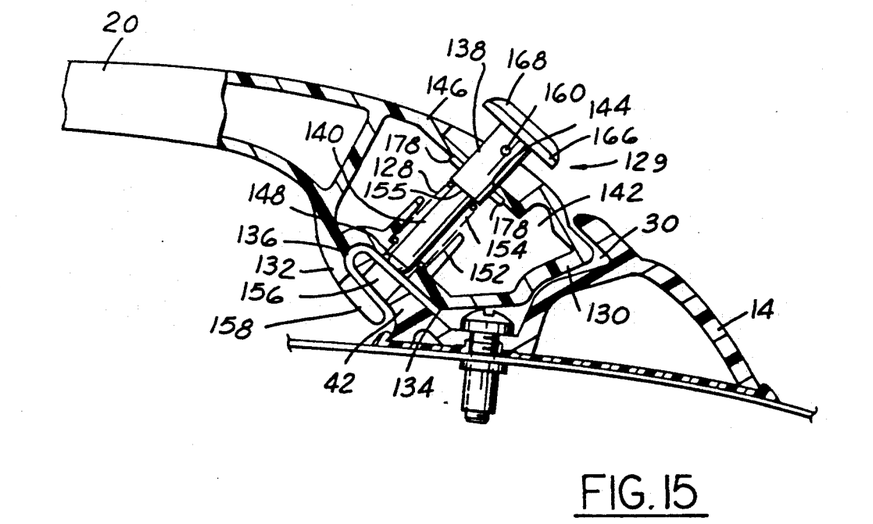
FIG. 15 is a sectional view of the structure of FIG. 14, but shows the locking pin retracted.

To retract the locking pin 129 to the FIG. 15 position, it is rotated 90° in either direction to align the stops 160 with the diametrically opposite slots 164 extending radially outwardly from the hole 144 in wall 146. These slots 164 clear the stops 160 and allow the locking pin to retract to the FIG. 15 position. The locking pin has on the upper end of the large diameter portion 138 exteriorly of the stanchion a head 166 formed with a raised ridge 168 extending diametrically across its outer surface. The locking pin can easily be rotated by grasping the ridge on the head and twisting.

Further retraction of the locking pin is blocked by the aligned pin-like stops 178 which project radially outwardly from diametrically opposite sides of the large diameter portion of the locking pin. Stops 178 are located near the shoulder 155 separating the large and small diameter portions of the locking pin and extend on a line at right angles to stops 160. These stops 178 engage in the recesses 162 in the inner surface of the outer wall 146 in the FIG. 15 position to prevent further retraction of the locking pin. Obviously, if it is desired to fully withdraw the locking pin 129 from the stanchion for repair or replacement, this can be done by a further quarter turn of rotation to align the stops 178 with the slots 164 in the outer wall 146 of the stanchion so that stops 178 can pass outwardly through the slots.

What is claimed is:

1. A luggage rack for an automatic vehicle having an exterior body surface, comprising a pair of elongated rails adapted to be mounted on said exterior body surface in laterally spaced apart, parallel relation, each of said rails having an elongated defining one side of said slot, said slots opening a rail flange defining one side of said slot, said slots opening at an angle sloping away from said exterior body surface and toward one another and said rail flanges also extending at an angle sloping away from said exterior body surface and toward one another when said rails are mounted on said exterior body surface as aforesaid, at least one cross member extending between said rails transversely thereof, stanchions at the ends of said cross member, said stanchions having body portions slidably engageable in said respective slots to permit said cross member to be adjusted longitudinally relative to said rails, each of said stanchions having a stanchion flange extending from said body portion thereof and forming therewith a generally U-shaped portion adapted to hook over said rail flange of one of said rails with said stanchion flange underlying said rail flange to resist separation of said stanchions from said rails, and means for releasably locking said stanchions in adjusted position longitudinally of said rails, said locking means comprising a plurality of apertures formed in said rail flange of each of said rails in spaced part relation along the length thereof, and an elongated locking pin mounted on each stanchion for straight-line longitudinal sliding movement from an extended position engageable in one of said apertures to a retracted position withdrawn therefrom, said locking pins being disposed with their axes extending at an angle sloping toward said exterior body surface and toward one another when said stanchions are engaged in said slots and said rails are mounted on said exterior body surface as aforesaid thereby reducing stress on said pins due to forces tending to separate said stanchions from said rails.

2. A luggage rack as defined in claim 1, including spring means urging each of said locking pins to the extended position thereof.

3. A luggage rack as defined in claim 2, wherein each of said locking pins has one end which is engageable in said apertures as aforesaid, and a cap at the opposite end of each said locking pin for use in withdrawing said locking pin to its retracted position, said caps having opposite edge portions and being pivotally connected intermediate said opposite edge portions to said opposite end of said locking pins so that when said locking pins are in their extended positions said caps are pivoted flat against said stanchions, said caps being adapted to be lifted away from aid stanchions and turned about one of the edge portions thereof as a fulcrum in slidable contact with said stanchions to withdraw said locking pins to said retracted positions while accommodating the straight-line movement thereof.

4. A luggage rack as defined in claim 1, wherein each of said locking pins has one end portion which is engageable in said apertures as aforesaid, said apertures and said one end portion of each of said locking pins being of matching non-circular cross-section.

5. A luggage rack as defined in claim 1, including a cap for each locking pin for withdrawing the same to its retracted position, said caps having opposite edge portions and being pivotally connected intermediate said opposite edge portions to the ends of said locking pins exteriorly of said chambers so that when said locking pins are in their extended positions said caps are pivoted flat against said stanchions, said caps being adapted to be lifted away from said stanchions and turned about one of the edge portions thereof as a fulcrum to withdraw said locking pins to said retracted positions, an opening in a wall of the chamber of each of said stanchions, each of said caps having a flexible latch extending from the said other of its edge portions into said chamber through said opening, and a retainer in the chamber of each of said stanchions for engaging and releasably retaining said latch when said caps are pivoted flat against said stanchions as aforesaid, said latches being released from said retainers by being manually flexed out of engagement therewith.

6. A luggage rack as defined in claim 5, wherein each of said chambers has a drain hole beneath said opening for draining said chamber of water entering through said opening.

7. A luggage rack as defined in claim 2, wherein each of said locking pins has one end which is engageable in said apertures as aforesaid, and a cap at the opposite end of each said locking pin for use in withdrawing said locking pin to its retracted position, each of said caps being in the form of a flap pivoted at one end to said opposite end of a locking pin and capable of being pivoted flat against said stanchion when said locking pins are in their extended positions, said stanchions having recessed portions for receiving said flaps when pivoted flat against said stanchions as aforesaid, said stanchions having relieved portions adjacent the free edge portions of said flaps to facilitate the lifting of said flaps away from said stanchions to withdraw said locking pins.

8. A luggage rack as defined in claim 2, wherein each of said locking pins has one end which is engageable in said apertures as aforesaid, and a handle at the opposite end of each said locking pin for use in withdrawing said locking pin to its retracted position, each of said handles being ring-shaped in the form of a half-circle with end portions turned toward one another and pivoted to said opposite end of a locking pin and capable of being turned flat against said stanchion when said locking pins are in their extended positions, said stanchions having recessed portions for receiving said handles when pivoted flat against said stanchions as aforesaid.

9. A luggage rack as defined in claim 1, wherein said locking pins are mounted on said stanchions for axial rotation, means for retaining each of said locking pins in extended position when axially rotated to a locking mode and for releasing the same when axially rotated away from said locking mode, and spring means urging said locking pins toward their retracted positions.

10. A luggage rack as defined in claim 9, including means for preventing withdrawal of each of said locking pins beyond said retracted position when axially rotated away from said locking mode.

11. A luggage rack as defined in claim 10, wherein said means for retaining said locking pins in extended position when in said locking mode comprises a stop projecting laterally from each of said locking pins, and abutment means on each of said stanchions engageable with said stop of the associated locking pin when said locking pin is in said extended position and in said locking mode, said abutment means clearing said stop when said locking pin is rotated away from said locking mode to permit withdrawal of said locking pin.

12. A luggage rack as defined in claim 11, wherein said means for preventing withdrawal of said locking pin beyond said retracted position when axially rotated away from said locking mode comprises a stop projecting laterally from each of said locking pins at right angles to said first-mentioned stop.

13. A luggage rack as defined in claim 1, wherein said stanchion flanges have clearance openings to clear said locking pins when said locking pins are in said extended position.

14. A luggage rack for an automatic vehicle having an exterior body surface, comprising a pair of elongated rails adapted to be mounted on said exterior body surface in laterally spaced apart, parallel relation, each of said rails having an elongated slot extending lengthwise thereof and having a rail flange defining one side of said slot, said slots opening at an angle sloping away from said exterior body surface and toward one another and said rail flanges also extending at an angle sloping away from said exterior body surface and toward one another when said rails are mounted on said exterior body surface as aforesaid, at least one cross member extending between said rails transversely thereof, stanchions at the ends of said cross member, said stanchions having body portions slidably engageable in said respective slots to permit said cross member to be adjusted longitudinally relative to said rails, and means for releasably locking said stanchions in adjusted position longitudinally of said rails, said locking means comprising a plurality of apertures formed in said rail flange of each of said rails in spaced apart relation along the length thereof, and an elongated locking pin mounted on each stanchion for straight-line longitudinal sliding movement from an extended position engageable in one of said apertures to a retracted position withdrawn therefrom, each of said locking pins having one end which is engageable in said apertures as aforesaid, and a cap at the opposite end of each said locking pin for use in withdrawing said locking pin to its retracted position, said caps having opposite edge portions and being pivotally connected intermediate said opposite edge portions to said opposite end of said locking pins so that when said locking pins are in their extended positions said caps are pivoted flat against said stanchions, said caps being adapted to be lifted away from said stanchions and turned about one of the edge portions thereof as a fulcrum in slidable contact with said stanchions to withdraw said locking pins to said retracted positions while accommodating the straight-line movement thereof.

15. A luggage rack as defined in claim 14, wherein each of said caps has a flexible latch extending from the other of said edge portions thereof, and a retainer on each of said stanchions for releasably engaging and retaining said latch when said caps are pivoted flat against said stanchions as aforesaid, said latches being released from said retainers by being flexed out of engagement therewith.

* * * * *

UNITED STATES PATENT AND TRADEMARK OFFICE
CERTIFICATE OF CORRECTION

PATENT NO. : 5,170,920

DATED : December 15, 1992

INVENTOR(S) : Thomas R. Corrente, et al.

It is certified that error appears in the above-identified patent and that said Letters Patent is hereby corrected as shown below:

Column 6, line 21 change "automatic" to --automotive--;
line 25 after "elongated" insert --slot extending lengthwise
thereof and having a rail flange--; lines 26 and 27 delete
--a rail flange defining one side of said slot, said slots
opening--.

Column 7, line 4 change "aid" to --said--.

Column 8, line 23, change "automatic" to --automotive--.

Signed and Sealed this

Ninth Day of November, 1993

Attest:

BRUCE LEHMAN

Attesting Officer

Commissioner of Patents and Trademarks